Oct. 11, 1960     C. L. EDWARDS, JR., ET AL     2,955,590
SUPPLEMENTAL HEATING UNIT
Filed April 10, 1958
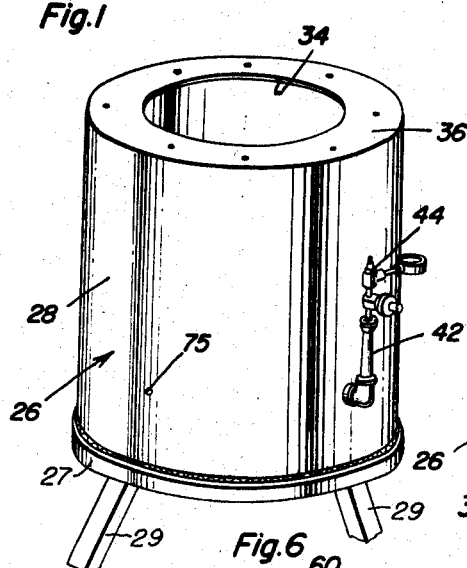
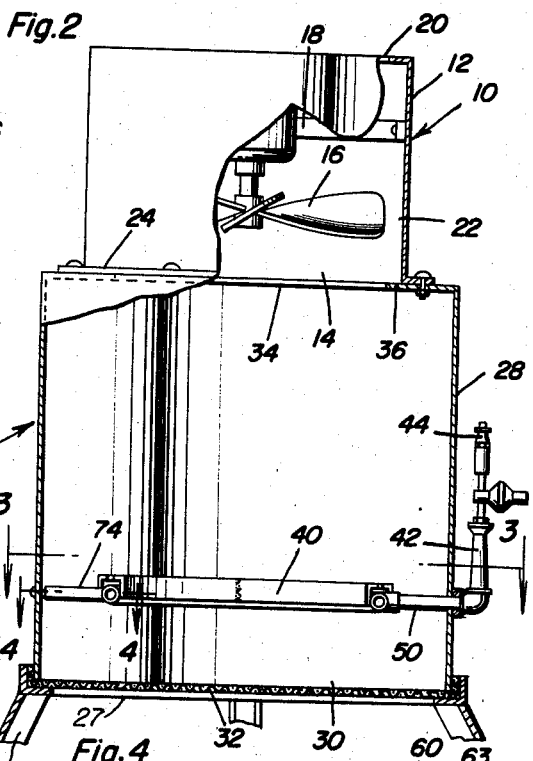
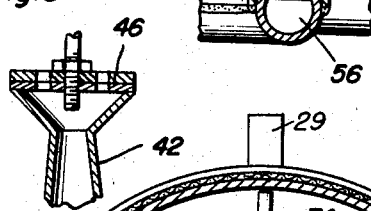
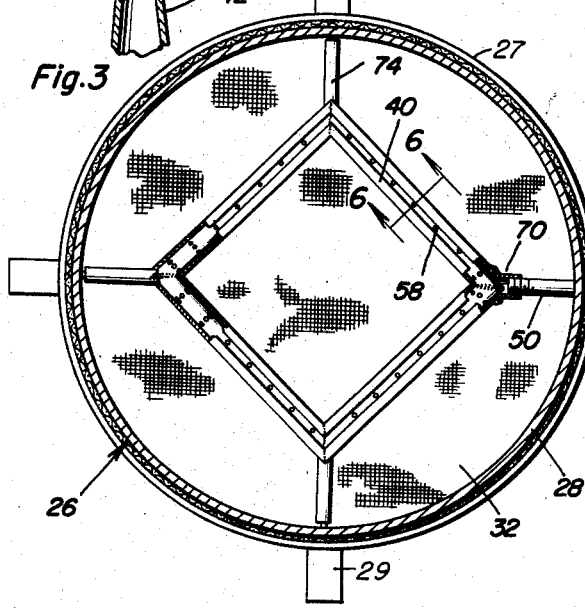
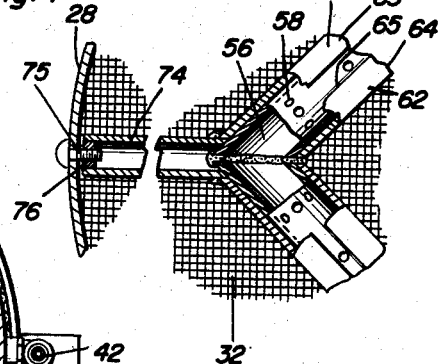
Charles L. Edwards, Jr.
Jenkins R. Satterthwaite
INVENTORS

United States Patent Office 2,955,590
Patented Oct. 11, 1960

2,955,590

SUPPLEMENTAL HEATING UNIT

Charles L. Edwards, Jr., and Jenkins R. Satterthwaite, both of Rte. 1, Tarboro, N.C.

Filed Apr. 10, 1958, Ser. No. 727,664

2 Claims. (Cl. 126—85)

This invention relates to an attachment for a fan, blower or the like and more particularly to a supplemental heater adapted to be so used.

An object of the invention is to provide a supplemental heater which may be connected with most manufacturers' makes of blowers in order to heat the incoming draft air so that the blower distributes warm air. Although the principal application of this invention is in connection with the drying of peanuts, grain and the like, it may be used in many other environments.

A more specific object of the invention is to provide a supplemental heater adapted to be connected with a conventional blower, the heater including a casing with one end adapted to connect to the blower housing inlet and containing a heating element, preferably gas operated. The heating element construction is of importance, being mechanically simple and yet effective in its location in the casing. Being in a direct draft of the blower inlet, ample and copious quantities of air to support combustion pass in, around and over the heating element.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a supplemental heating unit constructed in accordance with the invention and shown mounted on a base.

Figure 2 is an elevational view showing the heating unit in use, parts being broken away in section to illustrate internal detail.

Figure 3 is a transverse sectional view taken on the line 3—3 of Figure 2.

Figure 4 is an enlarged sectional view taken on the line 4—4 of Figure 2.

Figure 5 is a sectional view of the air-to-fuel mixture control of the heating unit element.

Figure 6 is a sectional view taken on the line 6—6 of Figure 3.

In the accompanying drawings there is a conventional blower 10 that has a blower housing 12 provided with an air inlet 14 and a blower 16. The blower is mounted, for example, by mounting bracket 18 within housing 12 and is arranged to draw a draft through inlet 14 and discharge the draft of air through an outlet 20. The inlet and outlet 14 and 20 respectively are in alignment with the blower chamber 22 that accommodates the blower 16. Mounting flange 24 is at the inlet end of the housing 12.

The supplemental heating unit 26 constructed in accordance with the invention, has a casing 28 with a cylindrical side wall, although this shape may be varied. Further, unit 26 may be supported and used in a number of different ways. Therefore, an ordinary base frame 27 (Figs. 1–3) having legs 29, diagrammatically illustrates a suitable support for the unit. An air inlet opening 30 is at one end of the casing 28 and has a screen 32 extending thereover. There is an outlet 34 at the opposite end of casing 28 around the periphery of which mounting flange 36 protrudes. The mounting flange has bolt holes so that flange 24 can be bolted directly thereon. This aligns the heated air outlet 34 and the air inlet 14.

A heating element 40 is disposed in the casing 28. The heating element 40 preferably uses gaseous fuel and therefore gas and air pipe 42 is connected by pipe fittings with the source of gas. Control valve 44 is in the gas line upstream of the air and gas mixture pipe 42. The gas line enters the gas pipe, and there is a mixture control valve 46 (Figure 5) therebetween.

A pipe 50 extends from the heating element 40 and attaches to the pipe 42 (Figure 2) so that gas and air mixed in proper proportions can be fed through the gas and air manifold 56 in casing 28.

The gas and air manifold is shown as being square since it can be made up of four pipes welded together at right angles. These pipes constitute a gas and air manifold 56, and the walls of the pipes have spaced groups 58 of openings in the upper parts thereof. The center hole of each group, which contains three holes, is exposed (Figure 4) while the two end holes are located beneath the two upper flanges 60 and 62 of elongated angle members 63 and 64. The other flanges of these angle members are disposed on the sides of the pipes of manifold 56 (Figure 6) and are welded thereto. The elongate slot 65 established by the spaced confronting edges of the two upper flanges of the angle members forms a port through which the gas and air mixture passes.

The means by which the heating element 40 is supported in the casing are mechanically simple. Pipe 50 is connected to a fitting 70 at one corner of the heating element, and the fitting 70 is registered and opens into the manifold 56. The other three corners of the heating element are supported by similar assemblies. Each consists of a short pipe 74 that is welded to the corner of the heating element and which has a bolt 75 in a plug 76 at its opposite end. The bolt is passed through a hole in the side wall of casing 28 thereby firmly mechanically connecting the heating element in place within the casing and between the inlet and outlets thereof. As shown in Figure 2, the heating element 40 is located closer to the inlet 30 than the outlet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A supplemental heating unit for a blower, said supplemental heating unit comprising a casing which has a free air inlet and a heated air outlet in alignment and spaced from each other, a heating unit located between said inlet and outlet and including a polygonal gas and air manifold, means for supporting said gas and air manifold in said casing between said inlet and outlet and including radially extending structures attached at their outer ends to said casing and at their inner ends to the corners of said polygonal manifold, one of said structures having a passageway through which a gas and air mixture may pass to enter said manifold, said manifold provided with spaced groups of openings through which the gas and air mixture is adapted to pass, and a pair of angle members having flanges attached to the sides of said manifold and having additional spaced flanges above said manifold and provided with edges which are spaced from each other and which form a slot through which the fuel and air mixture from the manifold is adapted to pass.

2. The supplemental heating unit of claim 1 wherein there is a blower mounting flange on said casing and having an opening defining said heated air outlet, and a screen extending across said free air inlet.

References Cited in the file of this patent

UNITED STATES PATENTS

| | | |
|---|---|---|
| 891,245 | Geurink | June 23, 1908 |
| 1,529,275 | Reece | Mar. 10, 1925 |
| 1,871,574 | Wood | Aug. 16, 1932 |
| 1,887,040 | Ragon | Nov. 8, 1932 |
| 2,159,149 | Hart | May 23, 1939 |
| 2,515,525 | Modlin | July 18, 1950 |
| 2,752,911 | Fisher | July 3, 1956 |